US008645289B2

(12) United States Patent
Bennett et al.

(10) Patent No.: US 8,645,289 B2
(45) Date of Patent: Feb. 4, 2014

(54) STRUCTURED CROSS-LINGUAL RELEVANCE FEEDBACK FOR ENHANCING SEARCH RESULTS

(75) Inventors: Paul Nathan Bennett, Kirkland, WA (US); Jianfeng Gao, Kirkland, WA (US); Jagadeesh Jagarlamudi, College Park, MD (US); Kristen Patricia Parton, New York, NY (US)

(73) Assignee: Microsoft Corporation, Redmond, WA (US)

( * ) Notice: Subject to any disclaimer, the term of this patent is extended or adjusted under 35 U.S.C. 154(b) by 393 days.

(21) Appl. No.: 12/970,879

(22) Filed: Dec. 16, 2010

(65) Prior Publication Data

US 2012/0158621 A1 Jun. 21, 2012

(51) Int. Cl.
*G06F 15/18* (2006.01)

(52) U.S. Cl.
USPC ............................................................ 706/12

(58) Field of Classification Search
USPC ...................................................... 706/12, 62
See application file for complete search history.

(56) References Cited

U.S. PATENT DOCUMENTS

| 2006/0265362 | A1* | 11/2006 | Bradford | 707/3 |
|---|---|---|---|---|
| 2007/0124202 | A1* | 5/2007 | Simons | 705/14 |
| 2007/0136276 | A1* | 6/2007 | Vella | 707/5 |
| 2009/0024613 | A1* | 1/2009 | Niu et al. | 707/5 |
| 2009/0222437 | A1* | 9/2009 | Niu et al. | 707/5 |
| 2010/0082511 | A1 | 4/2010 | Niu | |
| 2010/0106704 | A1 | 4/2010 | Josifovski | |
| 2010/0153315 | A1* | 6/2010 | Gao et al. | 706/12 |

OTHER PUBLICATIONS

Wu et al, "Ranking, Boosting, and Model Adaptation", Microsoft Research Technical Report MSR-TR-2008-109, Oct. 14, 2008.*
Hauptmann et al, "Topic Labeling of Multilingual Broadcast News in the Informedia Digital Video Library", ACM DL / SIGIR MIDAS Workshop, (1999).*
Lakshmi, "Using Cohesion—Model for Story Link Detection System", IJCSNS International Journal of Computer Science and Network Security, vol. 7 No. 3, Mar. 2007.*
Rogati et al, "Cross-Lingual Pseudo-Relevance Feedback Using a Comparable Corpus", C.A. Peters et al. (Eds.): CLEF 2001, LNCS 2406, pp. 151-157, 2002.*
White et al, "Comparing Query Logs and Pseudo-Relevance Feedback for Web-Search Query Refinement", SIGIR'07, Jul. 23-27, 2007.*

(Continued)

*Primary Examiner* — Jeffrey A Gaffin
*Assistant Examiner* — Ilya Traktovenko
(74) *Attorney, Agent, or Firm* — Lyon & Harr, LLP; Mark A. Watson

(57) ABSTRACT

A "Cross-Lingual Unified Relevance Model" provides a feedback model that improves a machine-learned ranker for a language with few training resources, using feedback from a more complete ranker for a language that has more training resources. The model focuses on linguistically non-local queries, such as "world cup" (English language/U.S. market) and "copa mundial" (Spanish language/Mexican market), that have similar user intent in different languages and markets or regions, thus allowing the low-resource ranker to receive direct relevance feedback from the high-resource ranker. Among other things, the Cross-Lingual Unified Relevance Model differs from conventional relevancy-based techniques by incorporating both query- and document-level features. More specifically, the Cross-Lingual Unified Relevance Model generalizes existing cross-lingual feedback models, incorporating both query expansion and document re-ranking to further amplify the signal from the high-resource ranker to enable a learning to rank approach based on appropriately labeled training data.

20 Claims, 3 Drawing Sheets

"Construction of the Cross-Lingual Unified Relevance Model"

(56) References Cited

OTHER PUBLICATIONS

Ko,J. "Probability Approaches for Answer Selection in Multilingual Question Answering". Thesis, Language Technologies Institute, Carnegie Mellon University. Aug. 27, 2007.*

Yan,R. "Probabilistic Models for Combining Diverse Knowledge Sources in Multimedia Retrieval". Thesis, Language Technologies Institute, Carnegie Mellon University. 2006.*

Carbonell, J.G. et al., "Translingual Information Retrieval: A Comparative Evaluation", In Proceedings of the 15th International Joint Conference on Artificial Intelligence, 1997.*

Tao et al, "Regularized Estimation of Mixture Models for Robust PseudoRelevance Feedback", SIGIR'06, Aug. 6-11, 2006, Seattle, Washington, USA.*

Gao, W., Research Statement, Department of Systems Engineering and Engineering Management, The Chinese University of Hong Kong, Sep. 21, 2009, pp. 3.

Gao, W., J. Blitzer, M. Zhou, Using English information in non-English web search, Proc. of the 2nd ACM Workshop on Improving Non English Web Searching, CIKM-iNEWS 2008, iNEWS 2008, Oct. 30, 2008, pp. 17-24, Napa Valley, California, USA.

Lavrenko, V., M. Choquette, W. B. Croft, Cross-lingual relevance models, Proc. of the 25th Annual Int'l ACM SIGIR Conf. on Research and Development in Info. Retrieval, SIGIR 2002, Aug. 11-15, 2002, pp. 175-182, Tampere, Finland.

Wang, X., A. Z. Broder, E. Gabrilovich, V. Josifovski, B. Pang, Cross-language query classification using web search for exogenous knowledge, Proc. of the Second Int'l Conf. on Web Search and Web Data Mining, WSDM 2009, Feb. 9-11, 2009, pp. 74-83, Barcelona, Spain.

Wang, X., A. Z. Broder, E. Gabrilovich, V. Josifovski, B. Pang, Cross-lingual query classification: A preliminary study, Proc. of the 2nd ACM Workshop on Improving Non English Web Searching, iNEWS 2008, Oct. 30, 2008, pp. 101-104, Napa Valley, California, USA.

* cited by examiner

STRUCTURED CROSS-LINGUAL RELEVANCE FEEDBACK FOR ENHANCING SEARCH RESULTS

BACKGROUND

1. Technical Field

A "Cross-Lingual Unified Relevance Model" provides various techniques for improving the web search quality of a low-resource language/market using the search results from a high-resource language/market.

2. Context

In general, the quality of web search relies on the availability of data resources used to develop search engines. Such resources include, but are not limited to, labeled training data, large amounts of web documents, and large amounts of user feedback data (e.g., user search histories and corresponding click-through logs, etc.). However, such data resources are very low in many languages/markets. A simple example of this is that data resources for user English language searches in the United States tend to be more complete than similar data resources for Korean language searches in South Korea.

More specifically, modern web search engines generally rely heavily on data-driven approaches that go beyond traditional information retrieval (IR) ranking by incorporating additional features into machine-learned rankers. Typical ranker features include "PageRank", click-through data, and various query and document classifiers. The "quality" of a learned ranker greatly depends upon the amount of training data available from different resources, such as human relevance judgments and user feedback.

While these resources are available in large quantities for some "high-resource" languages/markets (e.g., English/U.S.), for many other "low-resource languages/markets, the resources are not available or are very limited. Further, even if expensive human relevance judgments are collected, click-through data may not be plentiful for some smaller markets, while link analysis features may not be as helpful for nascent markets with fewer documents and links. Consequently, rather than annotating data for each low-resource market, several strategies have been applied to exploit existing high-resource rankers. One approach is to do domain adaptation of machine-learned rankers.

Some conventional work has addressed the language transfer challenge in IR by using English web search results to improve the ranking of non-ambiguous Chinese queries (referred to as linguistically non-local queries). Other research uses English as an assisting language to provide pseudo-relevant terms for queries in different languages. Unfortunately, the generality of these approaches is limited either by the type of queries or in the setting (e.g., traditional TREC style) they are explored. For example, one such technique uses training data from a general domain to improve the accuracy of English queries from a Korean market. However, in this particular case both in-domain and out-of-domain data are in English, hence the set of features used for the learning algorithm remain the same. Such solutions are not optimal, since, from a local perspective, users generally prefer local language queries that return local language results, e.g., Korean language queries that return Korean language results, rather than English language Queries from a Korean market.

In terms of tests to measure deviation of feature distributions, there have been some measures proposed in the domain adaptation literature to compute the distance between the source and target distributions of a feature. However, the literature in this area is mainly directed at deriving theoretical bounds on the performance of adapted classifiers. Consequently, such techniques may not be suitable to IR, because they do not adequately handle query-set variance and query-block correlation, and because such methods may require on-line computations during actual querying that can reduce query performance from a user perspective.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In general, a "Cross-Lingual Unified Relevance Model", as described herein, provides various techniques for improving the web search quality (i.e., improved relevance of search results provided to the user) of low-resource languages using the search results from one or more high-resource languages based on the same or highly related queries. The Cross-Lingual Unified Relevance Model generalizes existing cross-lingual relevance feedback models, incorporating both query expansion and document re-ranking to further amplify the signal from the high-resource ranker. Further, the Cross-Lingual Unified Relevance Model further uses a learning to rank approach, which uses labeled training data. Note that one advantage of using a learning-to-rank approach, as described herein, is the flexibility to incorporate features of different types.

The Cross-Lingual Unified Relevance Model works with "linguistically non-local" (LNL) queries that represent concepts that are of interest to (or searched/queried by) users in more than one language/market. For example, the queries "world cup" (English language, U.S. market), "copa mundial" (Spanish language, Mexican market) and "coupe du monde" (French Language, France market) are LNL since they are all likely about World Cup soccer. In contrast, the query "Brooklyn beaches" is considered to be a local query rather than an LNL query since there are no linguistic equivalents to the results of such a query in other markets (e.g., there is no Brooklyn in Mexico, and thus "Brooklyn beaches" is not locally relevant in the Mexican market). However, there may be Spanish language pages about the Brooklyn beaches, in which case, the techniques described herein might still be of use. As such, it should be understood that the availability of comparable search results in both languages enables the use of LNL queries to improve query results returned to the user.

More specifically, the Cross-Lingual Unified Relevance Model generally operates by retrieving results for a LNL query in the original language, L1, as well as an assisting language, L2, that has a more complete ranker. Note that it is assumed that the results from the L2 ranker are more complete than results from the L1 ranker. Therefore, the L2 results are used by the Cross-Lingual Unified Relevance Model to improve the L1 results, with the help of a translation dictionary. Note that this is not an instance of cross-lingual information retrieval, since the point is still to return results in L1 only. In other words, the Cross-Lingual Unified Relevance Model is not operating to simply translate a query in L1 to L2 to retrieve results in L2, it is instead using the results of a query in L2 using the translation from L1 to improve the query results for the original query in L1, while returning results in L1.

In view of the above summary, it is clear that the Cross-Lingual Unified Relevance Model described herein provides various techniques for improving the web search quality of a low-resource language/market using the search results from a high-resource language/market. In addition to the just described benefits, other advantages of the Cross-Lingual Unified Relevance Model will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

Figure 1:
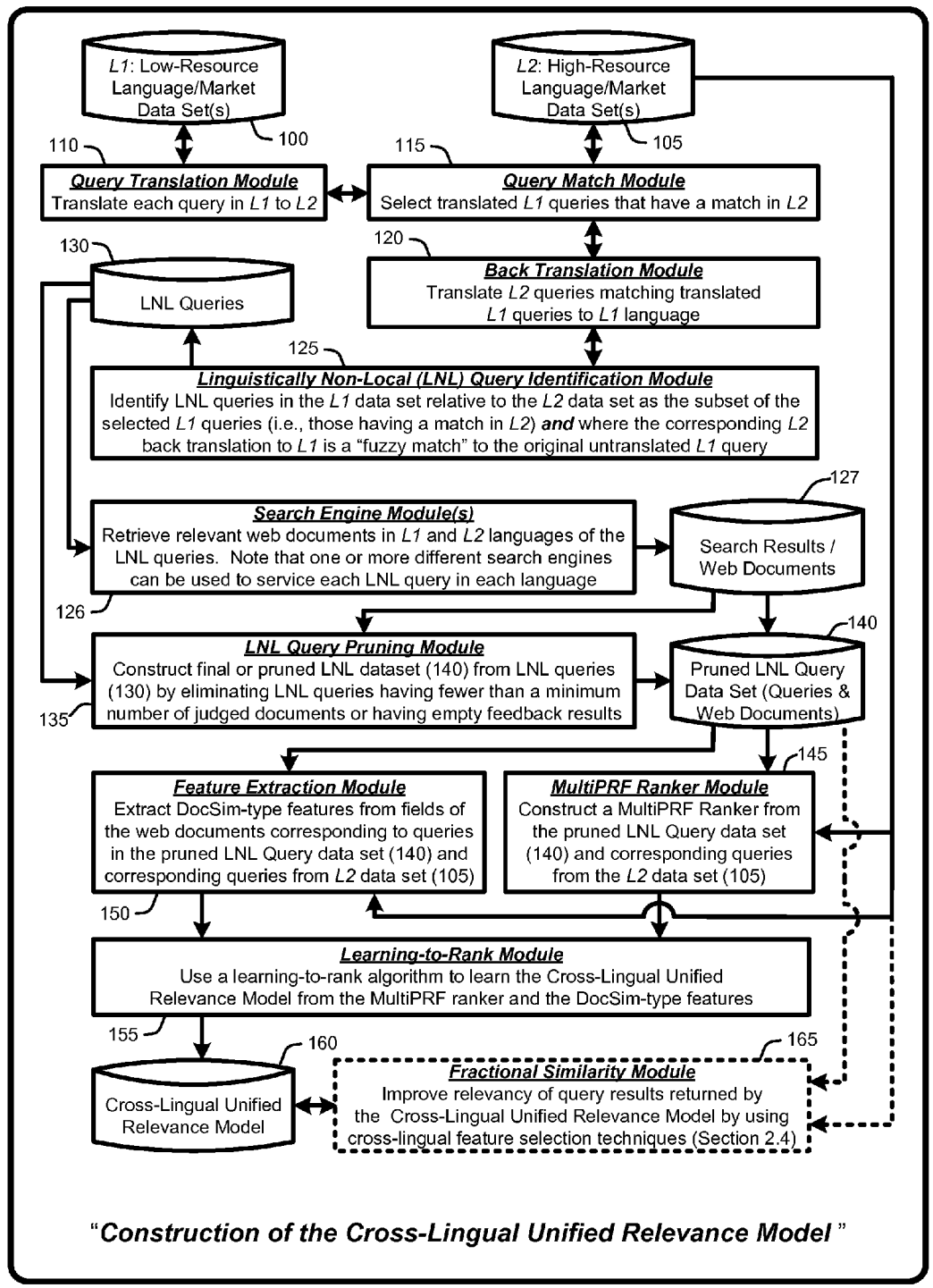
FIG. 1 provides an exemplary architectural flow diagram that illustrates program modules for implementing various embodiments of the Cross-Lingual Unified Relevance Model, as described herein.

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

In general, a "Cross-Lingual Unified Relevance Model," as described herein, provides various techniques based on "linguistically non-local" (LNL) queries for improving the web search quality of a low-resource language/market using the search results from a high-resource language/market. In other words, web search quality is improved by implementing a cross-lingual feedback mechanism that improves a ranker from a low-resource language and market (e.g., Korean language, South Korean market) having fewer training resources using feedback from a more complete ranker with many training resources (e.g., English language, U.S. market). Focusing on LNL queries mined from historical user search/ query logs and click-through data allows the Cross-Lingual Unified Relevance Model to use direct feedback from the high-resource ranker, rather than just using domain adaptation.

LNL queries are defined as similar queries that represent concepts that are of interest to (or searched/queried by) users in more than one language/market. For example, the queries "world cup" (English language, U.S. market), "copa mundial" (Spanish language, Mexican market) and "coupe du monde" (French Language, France market) are LNL since they are presumably all related to World Cup soccer. In contrast, the query "Brooklyn beaches" is considered to be a local query rather than an LNL query since there are no linguistic equivalents to the results of such a query in other markets (e.g., there is no Brooklyn in Mexico, and thus "Brooklyn beaches" is not locally relevant in the Mexican market). However, there may be Spanish language pages about the Brooklyn beaches, in which case, the techniques described herein might still be of use. As such, it should be understood that the availability of comparable search results in both languages enables the use of LNL queries to improve query results returned to the user.

In implementing the Cross-Lingual Unified Relevance Model, it is assumed that web search results using a high-resource language/market (such as English/US) are generally superior to results returned when using a low-resource language/market (e.g., Korean/South Korea, Russian/Russia, German/Germany, etc.). Based on this assumption, the Cross-Lingual Unified Relevance Model uses a cross-lingual relevance feedback model to get direct feedback from a more complete ranker (e.g., English/U.S.), for concepts that that are of interest in both markets (i.e., LNL queries). In practice, a query in language L1 is considered LNL if it has a high-confidence translation into a language L2 and the query translation is found in L2 query logs. By this metric, one recent study found that 45% of high frequency English queries and 35% of high frequency Chinese queries were LNL.

More specifically, the Cross-Lingual Unified Relevance Model generally operates by first retrieving results for a LNL query in the original language, L1, as well as an assisting language, L2, that has a more complete ranker (where the query in L2 is done using a translation of the original query in L1). Note that it is assumed that the results from the L2 ranker are more complete than results from the L1 ranker. Therefore, the L2 results are used by the Cross-Lingual Unified Relevance Model to improve the L1 results, with the help of a translation dictionary. Note that this is not an instance of cross-lingual information retrieval, since the concept is still to return results in L1 only. In other words, the Cross-Lingual Unified Relevance Model is not operating to simply translate a query in L1 to L2 to retrieve results in L2, it is instead using the results of a query in L2 using the translation from L1 to improve the query results for the original query in L1, while returning results in L1.

The Cross-Lingual Unified Relevance Model also provides a flexible framework based on the learning-to-rank approach to incorporate a wide range of features that are useful for web search, such as document structure and cross-lingual web features. For example, there are many cross-lingual anchor texts (e.g., English links pointing to Chinese pages) and user clicks (e.g., Russian queries that lead to English pages). These types of features provide stronger evidence of shared content across cross-lingual documents, or shared cross-lingual query intent. The high-resource domain is also richer in popularity fields, so exploiting this structural asymmetry serves to improve the performance of the Cross-Lingual Unified Relevance Model even more. Consequently, various embodiments of the Cross-Lingual Unified Relevance Model use a technique referred to herein as "Fractional Similarity" to further enhance the performance of the basic Cross-Lingual Unified Relevance Model through a cross-lingual feature selection process that leverages related content in both languages to improve the search results in L1.

1.1 System Overview:

As noted above, the "Cross-Lingual Unified Relevance Model," provides various techniques based on "linguistically non-local" (LNL) queries for improving the web search quality of a low-resource language/market using the search results from a high-resource language/market.

The processes summarized above are illustrated by the general system diagram of FIG. 1. In particular, the system diagram of FIG. 1 illustrates the interrelationships between program modules for implementing various embodiments of the Cross-Lingual Unified Relevance Model, as described herein. Furthermore, while the system diagram of FIG. 1 illustrates a high-level view of various embodiments of the Cross-Lingual Unified Relevance Model, FIG. 1 is not intended to provide an exhaustive or complete illustration of every possible embodiment of the Cross-Lingual Unified Relevance Model as described throughout this document.

In addition, it should be noted that any boxes and interconnections between boxes that may be represented by broken or dashed lines in FIG. 1 represent alternate embodiments of the Cross-Lingual Unified Relevance Model described herein, and that any or all of these alternate embodiments, as described below, may be used in combination with other alternate embodiments that are described throughout this document.

In general, as illustrated by FIG. 1, construction or learning of the Cross-Lingual Unified Relevance Model begins by providing one or more L1 low-resource language/market data sets 100 to a query translation module 110. As noted above, these L1 low-resource language/market data sets 100 include historical user search/query logs and click-through data. The query translation module 110 translates each query in the L1 low-resource language/market data sets 100 to a selected high-resource language, referred to herein as an L2 language (or source language). Note that rather than translate every query in the L1 low-resource language/market data sets 100, some percentage or number of the top or most common queries may also be selected for translation.

In various embodiments, translated L1 queries are then provided to a query match module 115 that selects any translated L1 query having a match to a query in an L2 high-resource language/market data set(s) 105. Next any of the L2 queries that match one of the translated L1 queries are translated to the L1 language by a back translation module 120. A linguistically non-local (LNL) query identification module 125 then compares the back translated L2 queries to the corresponding untranslated L1 queries to determine whether the corresponding L2 back translation to L1 is a "fuzzy match" to the original untranslated L1 query. If there is a fuzzy or approximate match, then the corresponding L1 queries are identified as a set of LNL queries 130. However, it should be understood that the basic point of the above-described modules is to check if the translation is valid. There are a variety of ways to do this rather than translate back and forth, as described. For example, in various embodiments, a similarity threshold is used on the translation of "snippets" for results returned in each language independently or a threshold on the query class similarity of each query independently. Note that "snippets" represent a small amount of text extracted from each result that is considered to be highly relevant to the query. Consequently, it should be appreciated that any desired techniques that validate the translation can be used by the Cross-Lingual Unified Relevance Model to identify the LNL queries.

At this point, search results or web documents 127 returned by one or more search engine module(s) 126 for the LNL queries in both the L2 and L1 languages are used in combination with the LNL queries by an LNL query pruning module 135 to construct a reduced or pruned LNL query data set 140 that includes LNL queries and their corresponding web documents 127. In general, the LNL query pruning module 135 acts to eliminate LNL queries 130 for which there are insufficient documents or information returned by the search engine module(s) 126 in the L1 and L2 languages for any particular LNL query. Note that this pruning process is discussed in more detail in Section 2.3.1.

Given the pruned LNL query data set 140, the next step is to separately construct a MultiPRF ranker from the LNL queries and the corresponding web documents, and to extract various "features" from the LNL queries and the corresponding web documents. More specifically, a MultiPRF ranker module 145 operates on the pruned LNL query data set 140 (using the corresponding queries in both the L1 and L2 languages) and the corresponding web documents to construct a MultiPRF that is specifically tailored to the pruned LNL query data set. See Section 2.3 for additional detail regarding construction of the MultiPRF ranker. A feature extraction module 150 is used to extract DocSim-type features from "fields" of the web documents and corresponding queries in the pruned LNL query data set 140. See Section 2.3 for additional details regarding feature extraction. Also, note that in the more general case, any learning-to-rank algorithm can be applied if some training data (e.g., query-url pairs with relevance judgments) is available. Note that "fields" of web documents include web document title, body, URL, anchor text, historical user clicks, etc.

Next, the extracted features and the MultiPRF ranker are provided to a learning module 155 that processes the features and the MultiPRF ranker to learn another ranking model, referred to herein as the aforementioned Cross-Lingual Unified Relevance Model 160. Note that examples of learning-to-rank algorithms that can be used to implement the learning module 155 include, but are not limited to LambdaRank, LambdaMART, or any other learning-to-rank algorithm. Once the Cross-Lingual Unified Relevance Model 160 has been learned, it is then made available for use in re-ranking search results in the L1 language/market.

Finally, in another embodiment, the Cross-Lingual Unified Relevance Model 160 is further improved via a Fractional Similarity module that, in general, acts to improve the relevancy of query results returned by the Cross-Lingual Unified Relevance Model by using a variety of cross-lingual feature selection techniques, as discussed in further detail in Section 2.4

2.0 Operational Details of the Cross-Lingual Unified Relevance Model:

The above-described program modules are employed for implementing various embodiments of the Cross-Lingual Unified Relevance Model. As summarized above, the Cross-Lingual Unified Relevance Model provides various techniques based on "linguistically non-local" (LNL) queries for improving the web search quality of a low-resource language/market using the search results from a high-resource language/market. The following sections provide a detailed discussion of the operation of various elements and embodiments of the Cross-Lingual Unified Relevance Model, and of exemplary methods for implementing the program modules described in Section 1 with respect to FIG. 1. In particular, the following sections provides examples and operational details of various embodiments of the Cross-Lingual Unified Relevance Model, including: an operational overview of the Cross-Lingual Unified Relevance Model; conventional cross-lingual relevance feedback techniques; the model enabled by Cross-Lingual Unified Relevance Model; and optional enhancements to the Cross-Lingual Unified Relevance Model using cross-lingual features.

2.1 Operational Overview:

As noted above, the Cross-Lingual Unified Relevance Model-based processes described herein provide various techniques that improves a machine-learned ranker for a language with few training resources, using feedback from a more complete ranker for a language that has more training resources. The model focuses on linguistically non-local queries, such as "world cup" (English/U.S. market) and "copa mundial" (Spanish/Mexican market), that have similar user intent in different languages and markets or regions, thus allowing the low-resource ranker to receive direct relevance feedback from the high-resource ranker. Among other things, the Cross-Lingual Unified Relevance Model differs from conventional relevancy-based techniques by incorporating both query- and document-level features. More specifically, the Cross-Lingual Unified Relevance Model generalizes existing cross-lingual feedback models, incorporating both query expansion and document re-ranking to further amplify the signal from the high-resource ranker to enable a learning to rank approach based on appropriately labeled training data.

2.2 Conventional Cross-Lingual Relevance Feedback Techniques:

The Cross-Lingual Unified Relevance Model builds on previous models, referred to herein as "MultiPRF" and "DocSim". These models are discussed below before presenting the Cross-Lingual Unified Relevance Model.

One of the baseline information retrieval (IR) systems used in various models is based on a language modeling (LM) framework. In this approach, documents are ranked by the similarity of their LMs ($\theta_d$) to the query LM ($\theta_q$), using Kullback-Leibler divergence. Document language models are smoothed using the collection LM via Dirichlet smoothing. Since search queries are often very short (e.g., 2 or 3 words), the query LM, $\theta_q$, is very limited. Pseudo-relevance feedback (PRF) attempts to overcome this problem by assuming that the top n documents are relevant and extracting an additional k query terms from them. The terms are weighted according to how often they appear in the feedback documents ($P(w|D)$) and how relevant the feedback documents are to the original query ($P(D|Q)$). A feedback relevance model, $\theta_f$, is then combined with the original query model using a mixture model, as illustrated by Equation 1, where:

$$P(w|\theta_{q'}) = (1-\lambda)P(w|\theta_q) + \lambda P(w|\theta_f) \quad \text{Equation (1)}$$

One conventional technique extended this monolingual PRF model to include cross-lingual documents to create a model referred to herein as MultiPRF. Specifically, given an LNL query and search results in L1 and L2, PRF is performed in both languages. PRF terms from L2 are translated back into L1 using a probabilistic translation dictionary ($P(f|e)$): $P(f|\theta_{trans}) = \Sigma e\, P(f|e)P(e|\theta_f)$. This final model is referred to as multilingual PRF (MultiPRF) because it does PRF in the query language (L1, $\theta_f$) as well as in the assisting language (L2, $\theta_{trans}$), combining them with a mixture model:

$$P(w|\theta_{q''}) = (1-\lambda-\gamma)P(w|\theta_q) + \lambda P(w|\theta_f) + \gamma P(w|\theta_{trans}) \quad \text{Equation (2)}$$

The intuition behind the MultiPRF model is that the L2 corpus is larger than the original L1 corpus, so there are likely to be more relevant documents in L2. Doing query translation (to retrieve the assisting language feedback documents) and then back translation (to translate back the PRF model) also yields a pivot language effect: synonyms and related terms are added to the query.

Another related technique, referred to herein as DocSim, introduced the concept of LNL queries, and presented a learning-to-rank model for cross-lingual relevance feedback. Given an LNL query and search results in L1 and L2, DocSim creates a weighted bipartite graph over the documents, connecting L1 documents with L2 documents. The weight of each edge of the graph represents the cross-lingual document similarity, which is calculated via cross-lingual cosine similarity. Finally, a relational ranking support vector machine is applied so that the ranks of L1 documents move closer to the ranks of similar L2 documents. For example, the official World Cup webpage in Arabic is very similar to the official World Cup webpage in English, so if the English page is ranked highly, the DocSim model will re-rank the Arabic page to also have a high rank.

2.3 The Cross-Lingual Unified Relevance Model:

Both the MultiPRF model and the DocSim model share the assumption that there is a high-resource ranker in L2 that has better monolingual accuracy than the L1 ranker. Further, MultiPRF exploits the fact that L1 and L2 queries have shared query intent, and works via cross-lingual query expansion. In contrast, the DocSim model assumes that documents relevant to LNL queries contain related document content, albeit in different languages.

In contrast to both the MultiPRF and DocSim techniques, the Cross-Lingual Unified Relevance Model takes a learning-to-rank approach which builds on both assumptions. First, a MultiPRF ranker is built for each of datasets (i.e., query/search logs in a particular language/market). Note that the original MultiPRF model was evaluated on CLEF data, where queries were specifically developed to have relevant results in both languages. Since this is not necessarily the case in web data, the Cross-Lingual Unified Relevance Model also evaluates the MultiPRF ranker on web data. Resulting ranker scores are then used as features for a unified learning-to-rank model, along with features derived by further extending the original DocSim model.

More specifically, the DocSim model was extended to handle web document structure. It is well-known to those skilled in the art that some fields in web documents are more salient than others. Therefore, in contrast to the aforementioned conventional techniques, rather than just calculating cross-lingual similarity over two full documents, DocSim type features were also calculated on each document field (e.g., url, title, anchor text, body, etc.). In addition, monolingual similarity features were calculated, in order to capture transliterations and Latin spellings (e.g., in the url field). Cross-lingual similarity was calculated using a translation dictionary derived from statistical machine translation, though both cosine and Jaccard similarity were used. For each similarity metric, a single L1 document was compared to each L2 document, and then the cross-lingual similarity scores were normalized and combined using a weighted average. In other words, the fields are modeled separately and combined to calculate the similarity metrics, rather than modeling documents corresponding to query results as a single text stream that concatenates all of the fields. Intuitively, this score represents the rank of similar L2 documents. In addition, DocSim type features can be calculated on derivatives of the document fields. For example by classifying the documents, snippets, titles, etc., into categories (e.g. "Music", "Science", "Business") similarity of the class distributions between the documents or the class distribution of the queries (when categorized into a similar ontology) can be computed. Features that provide the similarity of a document to the cross-lingual query categorization can also be computed and used as features in the ranker.

One simple example of these concepts is that user intent can be inferred from a high-resource language/market and transferred back to a low-resource language/market from which a query originated. Consider, for example, the German search term "kleider", which translated to English means "dresses". From typical English usage (i.e., historical user query/search logs), it is known that users that issue the English query "dresses" in the U.S. market are typically interested in categories such as "Shopping" and "Products/Clothing/Woman's Clothing". Consequently, knowledge of this class-distribution for the query can be transferred from English back to the original German. Note that in various embodiments, this process includes a check to ensure that the class-distribution has a minimal similarity match to prediction from German alone, which acts to limit or prevent erroneous information transfers resulting from poor automatic translations. In any case, the improved knowledge of the class-distribution in German is then used to match more relevant results when providing query results to the German user by re-ranking the results returned by the German ranker based on the intent implied from the English language/market.

The Cross-Lingual Unified Relevance Model takes in all the MultiPRF and DocSim-derived features, and uses the LambdaRank algorithm (or any other learning-to-rank training algorithm) to learn a ranking function. Note that LambdaRank is a ranking algorithm which has been shown empirically to optimize NDCG (Normalized Discounted Cumulative Gain), though LambdaMART or any other learning-to-rank algorithm could also be employed for this purpose. By utilizing both query- and document-level features, the Cross-Lingual Unified Relevance Model can fully leverage all of the above assumptions about LNL queries. Further, using LambdaRank enables the Cross-Lingual Unified Relevance Model to utilize an arbitrary number of features based on cross-lingual relevance feedback, rather than being limited to just query expansion (MultiPRF) or document similarity (DocSim).

2.3.1 Implementation of the Cross-Lingual Unified Relevance Model:

In general, construction of the unified model begins by providing one or more data sets comprising annotated historical query/search logs for various languages/markets. These data sets include one or more low-resource languages/markets, and at least one high-resource language/market (e.g., English/U.S.). In other words, these data sets included one or more L1 (low-resource) type data sets, and at least one L2 (high-resource) type data sets.

Examples of L1 type data sets used in a tested embodiment of the Cross-Lingual Unified Relevance Model include annotated search engine data from a Korean/South Korea market and a Russian/Russia market. In both of these cases, annotated search engine data from an English/U.S. market was used for the L2 data. The L1 annotated data was first filtered to select potential LNL queries. All selected queries were then translated into English using a conventional translator application. Translations were considered "high-confidence" if back-translation from the L2 translation to the original L1 language produced a fuzzy match to the original L1 query. High-confidence English query translations (i.e., translated L1 queries) that also occurred in a large set of English queries (from the L2 data set) were then selected as LNL queries.

In other words, queries translated from L1 to L2 were then back-translated to L1. If the back-translated queries were a relatively close match to the original queries, then those "matching" queries were considered high confidence queries. The L2 data set was then searched to find original L2 queries that were the same as the high-confidence translated queries from the L1 data set to the L2 language. Any high-confidence translated L1 queries that also occurred in the L2 data set were then identified as LNL queries. However, as noted above, it should be understood that the basic point here is to check if the translation is valid. There are a variety of ways to do this rather than translate back and forth, as described above. For example, in various embodiments, a similarity threshold is used on the translation of "snippets" for results returned in each language independently or a threshold on the query class similarity of each query independently. Note that "snippets" represent a small amount of text extracted from each result that is considered to be highly relevant to the query. Consequently, it should be appreciated that any desired techniques that validate the translation can be used by the Cross-Lingual Unified Relevance Model to identify the LNL queries.

Next, for each LNL query from the L1 data set, some number of the top L2 results were retrieved from the L2 data set (using the L2 translation of each L1 LNL query. In a tested embodiment, the number of top L2 results retrieved by this process was 50 results (though either more or less can be used, if desired), where each result consists of a URL, title and snippet. Note that "snippets" represent a small amount of text extracted from each result that is considered to be highly relevant to the query. Further, for each LNL query from the L1 data set, all L1 URLs that were annotated for relevance were crawled, and their anchor texts were also retrieved. Note that "anchor texts" are the visible, clickable text in a hyperlink. Anchor text usually gives the user relevant descriptive or contextual information about the content of the link's destination. Consequently, the anchor text often provides useful information for ranking purposes. Following this process, L1 queries having some minimum number of judged documents (i.e., L1 results corresponding to the original L1 query) and non-empty feedback results were kept in for a final or pruned L1 LNL dataset used to construct the Cross-Lingual Unified Relevance Model. In a tested embodiment, this minimum number of judged documents was about 10 for any L1 query. However, this minimum value can be set higher or lower, as desired.

All crawled L1 documents remaining in the final L1 LNL dataset and corresponding L2 feedback results were then split into separate web document fields. For feedback results, the body field (i.e., the text of the document) of each document was replaced with the corresponding snippet. Since the snippet contains a small amount of text highly relevant to the query, using the snippet retains the signal from the feedback documents, while also speeding up the document comparison calculation since the snippet is generally much smaller in size then the corresponding document. However, it should be appreciated that replacing the body field with a snippet, as noted above, is an optional step, and that document comparisons can be performed using the body field rather than the snippets. However, comparing body fields rather than snippets will increase the computational overhead of constructing or updating the Cross-Lingual Unified Relevance Model. Further, another option here is to compare other summaries of the document such as (supervised) class distributions or latent topic distributions.

For each L1 language/market used, a MultiPRF ranker was then constructed from the final L1 LNL dataset and from corresponding queries in the L2 data set. Further, DocSim-type features were extracted from the final L1 LNL dataset and from corresponding queries in the L2 data set. Next, as discussed above, for each unified model (i.e., a particular Cross-Lingual Unified Relevance Model tailored to a specific L1 language/market based on a specific L2 language/market), the corresponding MultiPRF ranker and DocSim-type features were provided to a LambdaRank process that then learned the corresponding ranking function (i.e., the Cross-Lingual Unified Relevance Model for the particular L1 language/market relative to the selected L2 language/market).

Finally, once the Cross-Lingual Unified Relevance Model for the particular L1 language/market has been constructed, queries entered by a user in the L1 language/market are then processed by the Cross-Lingual Unified Relevance Model to re-rank the L1 query results returned by whatever search engine is being used by that user. In addition, it should be noted that the Cross-Lingual Unified Relevance Model can be further improved using the cross-lingual feature selection techniques described in Section 2.4.

2.4 Cross-Lingual Features:

As noted above, the Cross-Lingual Unified Relevance Model can be further enhanced by incorporating various cross-lingual feature selection techniques into the overall model. Cross-lingual feature selection, as described herein, addresses some of the problems of using training data from one language/market (e.g., English/U.S.) to further improve the search performance in a foreign language/market (e.g., German/Germany) by automatically identifying the ranker's input features that deviate significantly across markets. In a very basic sense, this concept is like a search engine in an L1 type language/market that has insufficient resources (i.e., sufficiently detailed query/search logs) receiving ranking assistance from a search engine in an L2 type market that has highly detailed query search logs that allow more accurate rankings for query results. For example, using these techniques, a German language ranker (or other relatively low-resource ranker) can be improved using English language search engine data.

More specifically, the cross-lingual feature selection described herein addresses the scenario where similar or matching user queries in different languages may not be available and the necessary information for ranking is represented as a feature vector for every query-document pair.

The cross-lingual feature selection technique described herein uses a machine learning approach and poses knowledge transfer (i.e., information or intent regarding a query in one language) across languages as a feature selection problem. Specifically, the techniques described herein identify features which have similar distribution across languages and hence their data from English (or other source language) can be used in training foreign language rankers which have generally been on much smaller data sets than English language rankers. These techniques are referred to herein as "Fractional Similarity" because they identify a feature's similarity across English (or other source language) and foreign language training data.

These techniques address two shortcomings of significance tests in the IR setting. First, as is well known to those skilled in the art, variance in an observed statistic over an IR collection is primarily dependent on differences in the query set. This mismatch, which is referred to herein as "query-set variance," is especially problematic in the transfer setting since the query sets from the two markets (i.e., an L1 low-resource market, and an L2 high-resource market) are generally significantly different. Second, the document feature vectors for a specific query are often correlated (at least in some features), this query-block correlation can exacerbate the first problem by causing large shifts in a statistic for a feature based on whether the query is considered or not. As noted above, the Fractional Similarity extension to the Cross-Lingual Unified Relevance Model addresses both of the aforementioned problems.

By adapting significance tests to a query-centric sampling setting, Fractional Similarity enables a fair comparison between different features. Note that the use of Fractional Similarity is discussed relative to an IR scenario for use in ranking features based on their similarity value to enable feature selection. Note also that in various tested embodiments, it was observed that optionally dropping mismatched features from English data (or other source language) and using the rest of the training data helps in improving the search accuracy in the foreign language and compares favorably to a baseline based on KL divergence.

Because of the high variance of a feature within a language and the challenges of comparing samples from two different query sets, traditional statistical significance tests output negligible probabilities, thereby failing to correctly discriminate between feature distributions that truly differ and those that do not across languages. The Fractional Similarity techniques described herein overcome this problem by explicitly accounting for within language variance of a feature by sampling in query blocks and normalizing by a within language factor. This increases the robustness of the techniques described herein and enables a fair comparison of the similarity scores between different features.

Note that the following discussion will use English data as the source language (i.e., high-resource language/market) for enabling the Fractional Similarity techniques described herein. However, it should be understood that any other desired language having sufficient data can be used as a source language relative to any desired foreign language. Consequently, for purposes of explanation, the Fractional Similarity based techniques discussed herein will generally be described in terms of English data relative to some comparatively low-resource foreign language, such as German, for example.

2.4.1 Challenges in Computing Feature Similarity:

The following paragraphs describe some of the challenges in computing the similarity of feature distributions across languages. While some of these challenges are specific to Information Retrieval (IR), many of them exist in other scenarios as well.

Note that the following discussion refers to BM25F ranking. As is well-known to those skilled in the art, BM25 is a ranking function often used by search engines to rank matching documents according to their relevance to a given search query. It is based on probabilistic retrieval framework. In general, BM25, and its variants such as BM25F, represent state-of-the-art TF-IDF-like retrieval functions used in document retrieval applications, such as Web search. BM25F is a well-known extension of BM25 in which the document is considered to be composed from several fields (such as headlines, main text, anchor text, etc.) with possibly different degrees of importance. Therefore, since BM25F is a well-known to those skilled in the art, it will be referenced below without providing a detailed description of the functionality of BM25F.

In general, determining whether a feature distribution is similar across markets can be a challenging problem. For example, the well-known BM25F function produces a score for each document indicating the relevance of the document to a particular query. These scores or often referred to as a "feature" or "feature value" in machine learning terminology. A probability density function (PDF) can be constructed in each language that summarizes the likelihood of seeing a score of a certain value for a particular feature based on training data sets in the language (e.g., English, French, and German). Note that such PDFs are referred to as the "feature distribution of a feature" in the following paragraphs. In fact, using these three languages for purposes of discussion, it has been observed that the distribution of BM25F scores in French and German languages for particular features bear a closer resemblance to each other than to that of English. These differences in the distributions could potentially be significant enough to negatively impact cross-lingual transfer learning. Consequently, the Fractional Similarity techniques described herein are intended to address such issues.

While conventional statistical tests to measure divergence in distributions exist, they are generally ill-suited to this problem for two reasons stemming from query-based variance.

The first of these effects on variance results from the query-block correlation that occurs among related documents. That is, in the IR learning to rank setting, there is typically a training/test instance for each query-document pair, and for each query, a block of instances exist corresponding to differing documents relationship to the query. Because these documents are often related to the query in some way (e.g., top 100) that made them a candidate for final ranking, their features will often be correlated.

For example, consider a slightly exaggerated case for a feature, "Number of query_words_found_in_document". By the very nature of the documents being initial matches, all of them are likely to have similar values (probably near the query length). While for a different query, the same feature takes a different value but also highly correlated within the query. While it has been argued that a proper normalization (e.g., normalization by query length) can alleviate this problem, the Fractional Similarity techniques described herein are implemented based, in part, on the assumption that this problem is more general both in this case and also may occur for other features such as those based on link analysis or behavioral data where there is no obvious normalization. The net effect is that even within a language, statistics such as the mean or variance of a feature can often shift considerably based on the inclusion/exclusion of a small set of queries and their associated blocks.

A related challenge is that of query-set variance. That is, when comparing two different query sets, a feature can appear superficially different ultimately because the queries are different and not because how the feature characterizes the query-document relationship is different. Within a single language this can be a formidable challenge of its own and arises in large part because of query-block correlation, but across languages, this problem can be even worse since the query sets can differ even more (e.g., the most common queries, sites, etc., may differ across languages, cultures, regions).

As a result, the Fractional Similarity techniques described herein consider the impact of query-block correlation and query-set variance within the market whose data is to be transferred (e.g., a high-resource English market) and use that as a reference to determine what deviations in the foreign language (e.g., a comparatively low-resource French or German market) are actually significant.

2.4.2 T-Test:

The Fractional Similarity techniques described herein generally compute the similarity of a feature's distribution across languages by building on the well-known T-test. The following paragraphs provide a brief review of the T-test followed by a detailed discussion of Fractional Similarity in Section 2.4.3 and Section 2.4.4.

Given two samples ($X_1$ and $X_2$) from an unknown underlying distribution, a T-test can be used to verify if the means of both the samples are equal or not. Since the variance of a feature may differ across languages, a more general form is used that assumes a possibly different variance for the two variables to be compared. Let $\mu_1$ and $\mu_2$ denote the means of both the samples and $\sigma_1^2$ and $\sigma_2^2$ denote the variances of both the samples, then the t-statistic (t) and the degrees of freedom (d. f.) are given by Equation (3) and Equation (4), as follows:

$$t = \frac{\mu_1 - \mu_2}{\sqrt{\frac{\sigma_1^2}{n_1} + \frac{\sigma_2^2}{n_2}}} \quad \text{Equation (3)}$$

$$d.f. = \frac{(\sigma_1^2/n_1 + \sigma_2^2/n_2)^2}{(\sigma_1^2/n_1)^2/(n_1-1) + (\sigma_2^2/n_2)^2/(n_2-1)} \quad \text{Equation (4)}$$

where $n_1$ and $n_2$ are the respective sample sizes. Both these statistics along with the conventional "Students t-distribution" can be used to get the probability (referred to as the "p-value" function in the pseudo-code presented in "Algorithm 1" in Section 2.4.3) of observing the result under the null hypothesis that the means of the samples are equal.

Note that in statistical significance testing the interest is typically in showing that a new result is different from the baseline, which is demonstrated by showing that the p-value is lower than a threshold value. However, in the case of transfer, the interest is instead in finding the similarity of two samples, so it is desired to have the means of both the samples be same, meaning that it is desired that the p-value is higher.

In implementing Fractional Similarity, the result illustrated below is also used, where the mean and variance of a convex combination of the above samples ($X^\alpha = (1-\alpha)X_1 + \alpha X_2$) with $\alpha \in [0,1]$ is given by Equation (5), where:

$$\mu^\alpha = (1-\alpha)\mu_1 + \alpha\mu_2 \text{ and } \sigma_\alpha^2 = (1-\alpha)\sigma_1^2 + \alpha\sigma_2^2 - (\mu^\alpha)^2 \quad \text{Equation (5)}$$

Note that these expressions are used by the Fractional Similarity techniques, as discussed in further detail in Section 2.4.3, to compute the mean and variance of an arbitrary convex combination of two random samples.

2.4.3 Fractional Similarity:

A direct application of the T-test to the problem of feature similarity would, for each feature, select random samples from both English (or other high-resource source language) and foreign language data sets and verify if the means of both the samples are equal or not. However, the impact of query-set variance across markets typically yields a T-test value close to zero probability in almost all cases, rendering it practically useless to rank the features. In reality, the simple T-test indicates that the sets are composed of different queries (an obvious fact) and not that the relationship the feature characterizes between the documents and the queries is significantly different (which is what is of interest).

The following idea is used to compute the similarity between two distributions (P and Q). If both the given distributions are the same (i.e., P≡Q), then, with high probability, any two random samples $P_s$ (drawn from P) and $Q_s$ (drawn from Q) are statistically indistinguishable among themselves and also from a convex combination $((1-\alpha)P_s + \alpha Q_s)$ of the samples. When the underlying distributions are indeed different (P≠Q), then for some value of $\alpha$, the convex combination starts looking different from both the samples. This observation is leveraged to compute the similarity.

In particular, treating the convex combination as if a fraction of examples are being replaced from $P_s$ with those of $Q_s$, then as more and more instances are replaced, the resulting sample starts looking different from the original sample $P_s$. Note that in the following discussion, $\alpha$ is used as a superscript when indicating an $\alpha$ combined sample. This "fraction of examples" to be replaced is used to make it look different from $P_s$ as indicative of the similarity between both the distributions (hence the name "Fractional Similarity"). The value of Fractional Similarity lies in the range 0 and 1 (though this range can be scaled to any desired range for particular implementations), with a higher value indicating better similarity of the underlying distributions.

Next, let $P_s^\alpha$ be the convex combination of the samples $P_s$ and $Q_s$, i.e., $P_s^\alpha \leftarrow (1-\alpha)P_s + \alpha Q_s$ and $P_s^r$ be another random sample (where superscript r stands for reference) drawn from P. Now the intent is to compare both $P_s$ and the convex combination with the reference sample. If $p_{pp}$ and $p_{pq}^{\alpha}$ denote the p-values obtained by the T-test on pairs of samples $(P_s, P_s^r)$ and $(P_s^{\alpha}, P_s^r)$ respectively, then computation of the Fractional Similarity uses the following statistic:

$$frac^{\alpha} = \frac{p_{pq}^{\alpha}}{p_{pp}} \quad \text{Equation (6)}$$

and Fractional Similarity is then defined as the maximum value of a such that $frac^{\alpha}$ is greater than a threshold value (C), i.e., Fractional Similarity=$argmax_{\alpha} frac^{\alpha} > C$. This new statistic explicitly takes within language variability into account, via the denominator of Equation (6), and as result it can be understood as a normalized version of across language variability.

Formally, the statistic provided by Equation (6) is inspired by the following observation: Let $H_{pp}$ denote the event that the means of both the samples $P_s$ and $P_s^r$ are equal and also let $H_{pq}^{\alpha}$ denote the event that the means of $P_s^{\alpha}$ and $P_s^r$ are equal. Since it is desired to account for the variance of a feature in its original distribution, the truth of the $H_{pp}$ event is assumed in order to determine the probability of the event $H_{pq}^{\alpha}$. In other words, it is desired to determine the following quantity:

$$Pr(H_{pq}^{\alpha} | H_{pp}) = \frac{Pr(H_{pp}, H_{pq}^{\alpha})}{Pr(H_{pp})} \quad \text{Equation (7)}$$
$$= \frac{Pr(H_{pp} | H_{pq}^{\alpha})Pr(H_{pq}^{\alpha})}{Pr(H_{pp})}$$

Now, consider both the events in the numerator: $H_{pq}^{\alpha}$ indicates the truth that $P_s^r$ has the same mean as that of an $\alpha$ noisy sample of $P_s$ which automatically implies that it also has the same mean as the original, noiseless, sample $P_s$ resulting in the truth of the event $H_{pp}$. In other words, $Pr(H_{pp}|H_{pq}^{\alpha})=1$. Thus the conditional probability reduces to Equation (6).

The hypothetical behavior of the joint probability (numerator in Equation (7)) and the statistic of Equation (6), i.e., $frac^{\alpha}$, can be explained as follows. As the value of $\alpha$ increases, the conditional probability in Equation (7) reduces and Fractional Similarity is the value ($\alpha^*$) at which the fraction falls below the threshold value (C). In other words, when $\alpha=0$, $P_s^{\alpha}$ becomes $P_s$ as a result the joint probability becomes $Pr(H_{pp})$ and hence the $frac^{\alpha}$ becomes 1. Further, as a approaches 1, more and more noisy instances are introduced, and eventually the joint probability reduces to $Pr(H_{pq})$ and $frac^{\alpha}$ reaches its minimum value of $$\frac{p_{pq}}{p_{pp}}.$$

The pseudo-code to compute the threshold value (C) value is shown in Algorithm 1, below. As can be seen in Algorithm 1, the code between lines 1-10 checks if the samples are either too dissimilar or very similar to each other. While lines 11-14 suggest a binary search procedure to find the value of $\alpha^*$. During the binary search procedure, for any given arbitrary a it is not necessary to explicitly combine instances from $P_s$ and $Q_s$ to obtain $P_s^{\alpha}$. Instead, since the T-test uses only mean and variance, the analytically derived values (Equation (5)) of the combined sample are used. This relaxation makes the search process both efficient and also more accurate as the corresponding curve becomes a non-increasing function.

---
Algorithm 1: FractionalSimilarity($P_s^r$, $P_s$, $Q_s$, C)
---
1:   $p_{pp} \leftarrow$ p-value($P_s^r$, $P_s$)           // within language variability
2:   $frac \leftarrow \frac{1.0}{p_{pp}}$
3:   if $frac \leq C$ then
4:       return 0
5:   end if
6:   $p_{pq} \leftarrow$ p-value($P_s^r$, $Q_s$)           // across language variance
7:   $frac \leftarrow \frac{p_{pq}}{p_{pp}}$
8:   if $frac > C$ then
9:       return 1
10:  end if
11:  Set $\alpha \leftarrow 1$                              // prepare for binary search over $\alpha$
12:  Let $P_s^{\alpha} \leftarrow (1 - \alpha)P_s + \alpha Q_s$
13:  Let $frac^{\alpha} \leftarrow \frac{\text{p-value}(p_s^r, p_s^{\alpha})}{p_{pp}}$
14:  return $\alpha^* = argmax_{\alpha}$ s.t. $frac^{\alpha} > C$     // do a binary search over a

2.4.4 Cross-Lingual Feature Selection using Fractional Similarity:

This following paragraphs describe how Fractional Similarity is used to identify features that have a similar distribution in both English (or other high-resource source language) and foreign language training data. Algorithm 2, below, provides pseudo-code that illustrates this use with reference to the FractionalSimilarity( ) pseudo-code illustrated by Algorithm 1.

---
Algorithm 2: FeatureSimilarity(E, F)
---
Input: Feature values in English (E) and the foreign language (F)
Output: Similarity of this feature in both these distributions
1:   for i = 1 → n do
2:       Generate random samples $E_s^r$, $E_s\sim E$ and $F_s\sim F$
3:       Estimate probability density function (PDF) from $E - \{E_s^r \cup E_s\}$
4:       Let $L_e^r$, $L_e$ and $L_f$ be average log-likelihood of the queries in each sample
5:       $\alpha_i^* \leftarrow$ FractionalSimilarity($L_e^r$, $L_e$, $L_f$) // see algorithm 1 for this function
6:   end for
7:   return Average($\alpha_1^*$, ···, $\alpha_n^*$)

Let there be a total of m queries in the English training data (E) (or other high-resource language). Two random samples, ($E_s^r$ and $E_s$), are first generated from E with 10% of queries in each sample (line 2 of the pseudo-code) leaving 80% of queries for training a PDF. Note that these percentages can be changed to any values desired, however, the listed values, i.e., 10%, 10%, 80% were observed to work well in various tested embodiments. A third sample, ($F_s$), is then generated from approximately the same number of queries from foreign language training data (F). Note that if is desired to include a query in any sample, then feature values corresponding to all the results of the query are included. At this point, an instance in any of the above three samples corresponds to the feature value of a query-document pair.

However, simply comparing the means of the feature values would not test if the entire distributions are similar. If there is a PDF of the feature, though, the value of the likelihood of a sample under that PDF can be used to transform the problem of verifying the equality of means to the problem of verifying if the underlying distributions are same. This holds because probability at any point is the area of an infinitesimal rectangle considered around that point. So by comparing the average log-likelihood values, the area under the trained English PDF is compared at random points drawn from English and foreign language distributions. Thus the similarity between these log-likelihood values is an indicator of the similarity between the underlying distributions from which the samples are drawn. Another advantage of using the likelihood is that it makes the approach amenable to different types of features, given an appropriate choice of PDF estimate.

Since it assumed that that English (or other high-resource language) has more training data, the probability density function (PDF) of this feature is estimated from the remaining 80% of English training data (line 3) using kernel density estimation. Next, the log-likelihood of the feature values in all the three samples is computed, followed by a computation of the average of all the instances per query (line 4). Let the average log-likelihood values of all the three samples be stored in $L_e^r$, $L_e$ and $L_f$, respectively. Here, each log-likelihood value is a property of a query which is an aggregate measure, the joint probability, over all the results of this query. Next, the Fractional Similarity described in Sec. 2.4.3 is used to compute similarity between the distributions that generated the log-likelihood values (line 5). For each feature, this process is then repeated multiple times to return the average of all the similarity values (line 7) as a measure of the similarity of this feature between English and foreign language training data.

There are two primary insights in the way that Fractional Similarity is applied to IR. The first one is that the sampling criterion is based on queries and not on query-document pairs. This implies that, while computing Fractional Similarity, it is desired to find the fraction of English queries that can be replaced with foreign language queries. Further, because queries are sampled as a unit, this enables the Fractional Similarity us to deal with query-specific variance more directly. Secondly, this also allows better handling of the query-set variance because the denominator of Equation (6), i.e., $p_{pp}$, includes normalization by an estimate of the within language query-set variance.

Finally, it should be understood that although the Fractional Similarity techniques described above have been developed in the context of Information Retrieval (e.g., for further improving the rankings returned by the Cross-Lingual Unified Relevance Model), it is applicable in any scenario in which correlation arises among groups of instances. Furthermore, with appropriate choice of PDF estimation techniques, it also straightforwardly extends to different types of features and to multivariate settings. In other words, the use of the Fractional Similarity techniques described herein are not tied to the Cross-Lingual Unified Relevance Model, and it should be clear that these Fractional Similarity techniques have a wide range of application beyond information retrieval settings.

Figure 2:
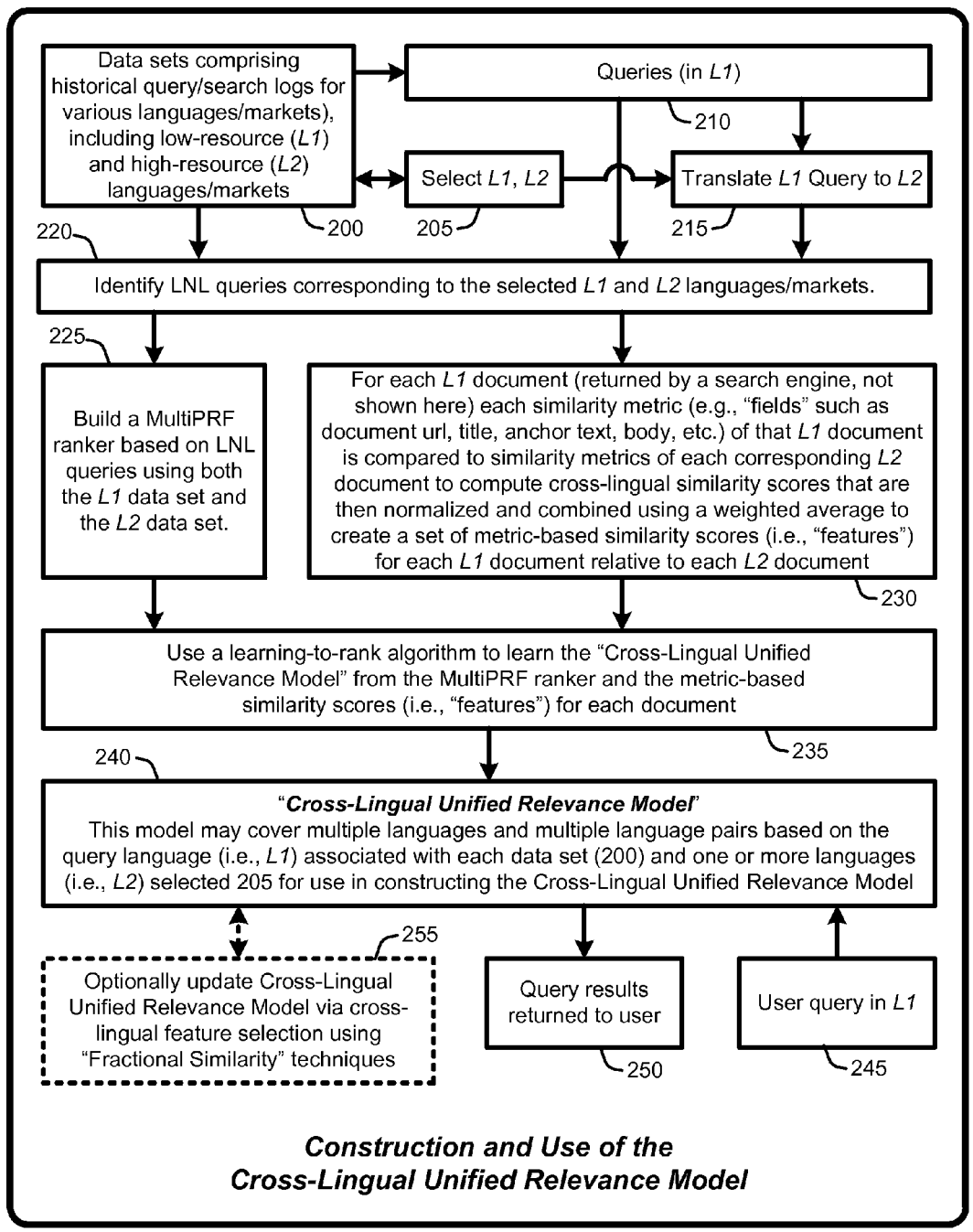
FIG. 2 illustrates a general system flow diagram that illustrates exemplary methods for implementing various embodiments of the Cross-Lingual Unified Relevance Model, as described herein.

3.0 Operational Summary of Cross-Lingual Unified Relevance Model:

The processes described above with respect to FIG. 1, and in further view of the detailed description provided above in Sections 1 and 2 are illustrated by the general operational flow diagram of FIG. 2. In particular, FIG. 2 provides an exemplary operational flow diagram that summarizes the operation of some of the various embodiments of the Cross-Lingual Unified Relevance Model. Note that FIG. 2 is not intended to be an exhaustive representation of all of the various embodiments of the Cross-Lingual Unified Relevance Model described herein, and that the embodiments represented in FIG. 2 are provided only for purposes of explanation.

Further, it should be noted that any boxes and interconnections between boxes that are represented by broken or dashed lines in FIG. 2 represent optional or alternate embodiments of the Cross-Lingual Unified Relevance Model described herein, and that any or all of these optional or alternate embodiments, as described below, may be used in combination with other alternate embodiments that are described throughout this document.

In general, as illustrated by FIG. 2, construction of the Cross-Lingual Unified Relevance Model begins by receiving one or more data sets 200 comprising historical query/search logs for various languages/markets. As noted above, these data sets 200 will include information from both low-resource languages/markets (i.e., L1 data sets) and high-resource languages/markets (i.e., L2 data sets). After selecting 205 the desired L1 and L2 data sets, queries 210 in the selected L1 data set are translated 215 to the L2 language.

Given the translated L1 queries in combination with matching queries in the original L2 data set 200, the next step is to identify 220 a set of LNL queries corresponding to the selected L1 and L2 languages/markets. Once the set of LNL queries has been identified 220, the next step is to build 225 a MultiPRF ranker based on the LNL queries using both the selected L1 and L2 data set 200. In addition, the LNL queries are also used to extract similarity metrics (e.g., DocSim-type metrics) from the LNL queries and corresponding documents returned for those queries by a conventional search engine. More specifically, as illustrated by box 230 of FIG. 2, for each L1 document (returned by a search engine for each L1 LNL query) each similarity metric of that L1 document is compared to each corresponding L2 document to compute cross-lingual similarity scores that are then normalized and combined using a weighted average to create a set of metric-based similarity scores for each L1 document relative to each L2 document. Note that multiple similarity metrics are computed, and that each is based on one of the fields of the document. For example, a web document is a multi-field document consisting of fields such as url, title, anchor text, body, etc.

Next, once the MultiPRF ranker and similarity scores have been created, the next step is to use 235 a learning-to-rank algorithm (such as LambdaRank or any other learning to rank algorithm) to learn a ranking function (i.e., the "Cross-Lingual Unified Relevance Model" 240) from the MultiPRF ranker and the metric-based similarity scores for each document. Note that this learned Cross-Lingual Unified Relevance Model 240 can cover multiple languages and multiple language pairs based on the query language (i.e., L1) associated with each data set 200 and one or more languages (i.e., L2) selected 205 for use in constructing the Cross-Lingual Unified Relevance Model.

Once the Cross-Lingual Unified Relevance Model 240 has been learned, it is then made available for use in re-ranking search results in the L1 language/market. In particular, it is simply used to re-rank query results 250 returned to the user in response to a user query 245 in the L1 language/market. In particular, when the user enters a query, the search engine that the query is addressed to returns a set of search results. However, instead of returning those results directly to the user, the results are first re-ranked by the Cross-Lingual Unified Relevance Model and then presented to the user. Finally, in another embodiment, the Cross-Lingual Unified Relevance Model 240 is further optionally updated 255 using the cross-lingual feature selection techniques (i.e., "Fractional Similarity") described in Section 2.4

Figure 3:
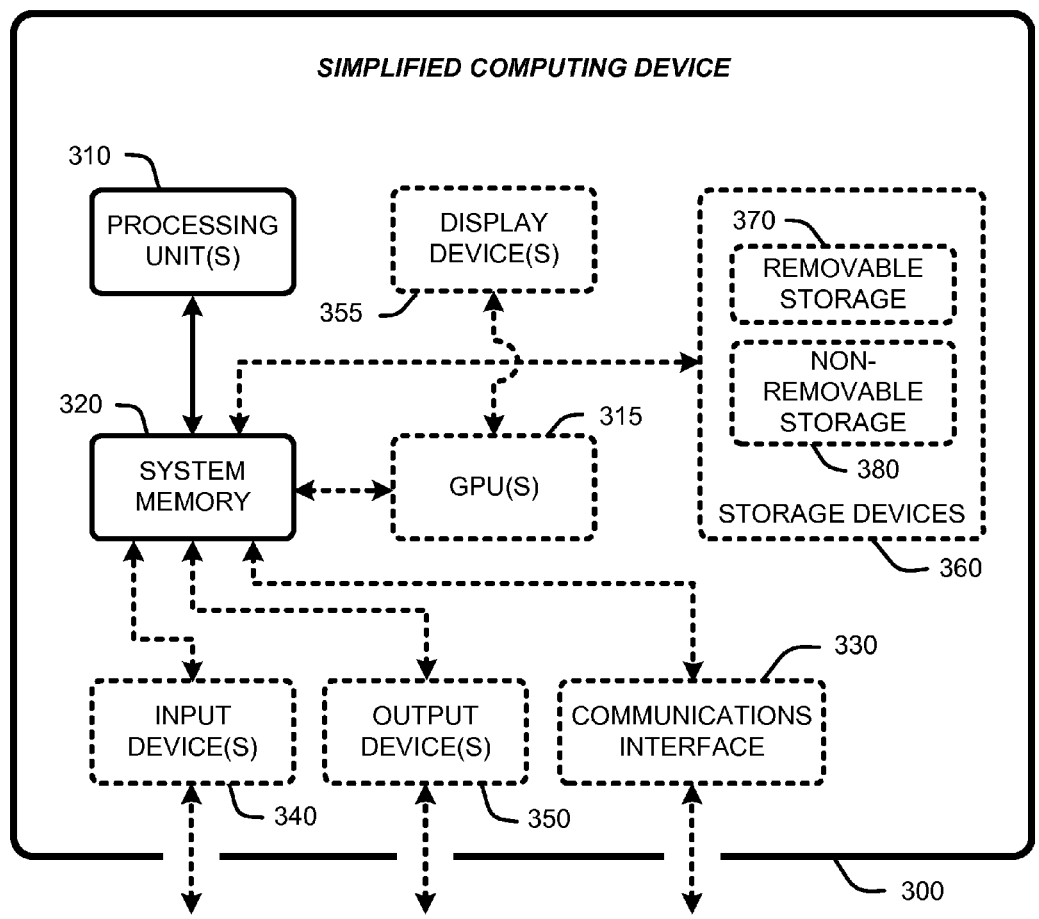
FIG. 3 is a general system diagram depicting a simplified general-purpose computing device having simplified computing and I/O capabilities for use in implementing various embodiments of the Cross-Lingual Unified Relevance Model, as described herein.

4.0 Exemplary Operating Environments:

The Cross-Lingual Unified Relevance Model described herein is operational within numerous types of general purpose or special purpose computing system environments or configurations. FIG. 3 illustrates a simplified example of a general-purpose computer system on which various embodiments and elements of the Cross-Lingual Unified Relevance Model, as described herein, may be implemented. It should be noted that any boxes that are represented by broken or dashed lines in FIG. 3 represent alternate embodiments of the simplified computing device, and that any or all of these alternate embodiments, as described below, may be used in combination with other alternate embodiments that are described throughout this document.

For example, FIG. 3 shows a general system diagram showing a simplified computing device 300. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, mini-computers, mainframe computers, audio or video media players, etc.

To allow a device to implement the Cross-Lingual Unified Relevance Model, the device has a sufficient computational capability and system memory to enable basic computational operations. In particular, as illustrated by FIG. 3, the computational capability is generally illustrated by one or more processing unit(s) 310, and may also include one or more GPUs 315, either or both in communication with system memory 320. Note that that the processing unit(s) 310 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 3 may also include other components, such as, for example, a communications interface 330. The simplified computing device of FIG. 3 may also include one or more conventional computer input devices 340 (e.g., pointing devices, keyboards, audio input devices, video input devices, haptic input devices, devices for receiving wired or wireless data transmissions, etc.). The simplified computing device of FIG. 3 may also include other optional components, such as, for example, one or more conventional computer output devices 350 (e.g., display device(s) 355, audio output devices, video output devices, devices for transmitting wired or wireless data transmissions, etc.). Note that typical communications interfaces 330, input devices 340, output devices 350, and storage devices 360 for general-purpose computers are well known to those skilled in the art, and will not be described in detail herein.

The simplified computing device of FIG. 3 may also include a variety of computer readable media. Computer readable media can be any available media that can be accessed by computing device 300 via storage devices 360 and includes both volatile and nonvolatile media that is either removable 370 and/or non-removable 380, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the Cross-Lingual Unified Relevance Model described herein, or portions thereof, may be stored, received, transmitted, or read from any desired combination of computer or machine readable media or storage devices and communication media in the form of computer executable instructions or other data structures.

Finally, the Cross-Lingual Unified Relevance Model described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

The foregoing description of the Cross-Lingual Unified Relevance Model has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Cross-Lingual Unified Relevance Model. It is intended that the scope of the invention be limited not by this detailed description, but rather by the claims appended hereto.

What is claimed is:

1. A method for constructing a cross-lingual ranker, comprising steps for:
   receiving a first set of user query logs in a first language;
   receiving a second set of user query logs in a second language different from the first language;
   translating queries from the first set of user query logs into queries in the second language;
   identifying a set of matching queries translated from the first language to the second language that have a match in the second set of query logs;
   for each matching query, using one or more search engine modules to identify a first set of query results corresponding to matching queries in the first language in a market associated with the first language and using one or more search engine modules to identify a second set of query results in the second language in a market associated with the second language;
   constructing a first ranker from the first set of query results, the second set of query results and the matching queries;
   for each matching query, calculating similarity metrics between one or more fields associated with corresponding query results of the first set of query results and the second set of query results; and
   learning a second ranker from the first ranker and the similarity metrics associated with each matching query.

2. The method of claim 1 wherein identifying the set of matching queries further comprises pruning the set of matching queries by back-translating matching queries in the second language to the first language and eliminating matching queries from the set of matching queries where the back-translated queries from the second language are not at least a fuzzy match to untranslated versions of corresponding matching queries in the first language.

3. The method of claim 1 further comprising re-ranking the first set of query results by applying the learned second ranker to those results.

4. The method of claim 1 further comprising updating the learned second ranker via a fractional similarity based cross-lingual similarity metric selection process.

5. The method of claim 1 further comprising using the learned second ranker to infer a query class distribution for the first language using translations of corresponding queries in the second language, and using the query-class distribution in the first language to help identify more relevant documents for queries in the first language by using similarity metrics which match result classes to query classes.

6. The method of claim 1 wherein the fields include one or more of web document title, body, URL, anchor text, and historical user clicks.

7. The method of claim 1 wherein the fields are modeled separately and combined to calculate the similarity metrics, rather than modeling documents corresponding to query results as a single text stream that concatenates all of the fields.

8. The method of claim 1 wherein a LambdaMart ranker is used to learn the second ranker.

9. A system for constructing a cross-lingual ranking model for re-ranking search results, comprising:
   one or more processors;
   a device for receiving a first set of user query logs in a first language;
   a device for receiving a second set of user query logs in a second language different from the first language;
   a device for translating queries from the first set of user query logs into queries in the second language;
   a device for identifying a set of matching queries translated from the first language to the second language that have a match in query logs of the second language;
   a device for using one or more search engine modules to identify a first set of query results corresponding to matching queries in the first language in a market associated with the first language and using one or more search engine modules to identify a second set of query results in the second language in a market associated with the second language for each matching query;
   a device for constructing a first ranker from the first set of query results, the second set of query results and the matching queries;
   a device for calculating similarity metrics between corresponding fields of the first set of query results and the second set of query results for each matching query; and
   a device for learning a cross-lingual ranking model from the first ranker and the similarity metrics associated with each matching query.

10. The system of claim 9 further comprising using the learned cross-lingual ranking model to re-rank query results in the first language that are returned by the one or more search engines.

11. The system of claim 9 further comprising updating the learned cross-lingual ranking model via a fractional similarity based cross-lingual similarity metric selection process.

12. The system of claim 9 further comprising using the learned cross-lingual ranking model to infer a query class distribution for the first language using translations of corresponding queries in the second language, and using the query-class distribution in the first language to help identify more relevant documents for queries in the first language by using similarity metrics which match result classes to the query-classes.

13. The system of claim 9 wherein the fields include one or more of web document title, body, URL, anchor text, and historical user clicks.

14. The system of claim 9 wherein the fields are modeled separately then combined to calculate the similarity metrics.

15. A computer-readable hardware storage device having computer executable instructions stored thereon for learning a cross-lingual ranking model, said instructions when executed by a computer cause the computer to perform operations comprising:
   receiving a first set of user query logs in a first language;
   receiving a second set of user query logs in a second language different from the first language;
   receiving a translation of queries from the first set of user query logs to queries in the second language;
   identifying a set of matching queries translated from the first language to the second language that have a match in query logs of the second language;
   for each matching query, using one or more search engine modules to identify a first set of query results in the first language in a market associated with the first language and using one or more search engine modules to identify a second set of query results in the second language in a market associated with the second language;
   constructing a first ranker from the first set of query results, the second set of query results and the matching queries;
   for each matching query, calculating similarity metrics between corresponding fields of the first set of query results and the second set of query results; and
   learning a cross-lingual ranking model from the first ranker and the similarity metrics associated with each matching query.

16. The computer-readable hardware storage device of claim 15 further comprising using the learned cross-lingual ranking model to re-rank query results in the first language.

17. The computer-readable hardware storage device of claim 15 further comprising updating the learned cross-lingual ranking model via a fractional similarity based cross-lingual similarity metric selection process.

18. The computer-readable hardware storage device of claim 15 further comprising using the learned cross-lingual ranking model to infer a query class distribution for the first language using translations of corresponding queries in the second language, and using the query-class distribution in the first language to help identify more relevant documents for queries in the first language by using similarity metric which match result classes to the query-classes.

19. The computer-readable hardware storage device of claim 15 wherein the fields include one or more of web document title, body, URL, anchor text, and historical user clicks.

20. The computer-readable hardware storage device of claim 19 wherein the fields are modeled separately then combined to calculate the similarity metrics.

\* \* \* \* \*